(12) United States Patent
Wang et al.

(10) Patent No.: US 8,913,246 B2
(45) Date of Patent: *Dec. 16, 2014

(54) ALL-FIBER INTERFEROMETRIC FIBER OPTIC GYROSCOPE HAVING A MINIMUM RECIPROCAL CONFIGURATION

(71) Applicant: Peking University, Beijing (CN)

(72) Inventors: Xinyue Wang, Beijing (CN); Ziyu Wang, Beijing (CN)

(73) Assignee: Peking University, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/963,937

(22) Filed: Aug. 9, 2013

(65) Prior Publication Data

US 2013/0321817 A1     Dec. 5, 2013

Related U.S. Application Data

(63) Continuation of application No. 13/042,336, filed on Mar. 7, 2011, now Pat. No. 8,514,401, which is a continuation-in-part of application No. PCT/CN2010/001175, filed on Aug. 3, 2010.

(30) Foreign Application Priority Data

Jul. 16, 2010    (CN) .......................... 2010 1 0232656

(51) Int. Cl.
*G01C 19/72*    (2006.01)
*G01C 19/64*    (2006.01)

(52) U.S. Cl.
CPC .............. *G01C 19/72* (2013.01); *G01C 19/727* (2013.01)
USPC ............ 356/465; 356/460; 356/461; 356/459

(58) Field of Classification Search
CPC .... G01C 19/72; G01C 19/726; G01C 19/722; G01C 19/727; G01R 15/246; G01D 5/3538; G01D 5/35322
USPC .................................. 356/460, 461, 459, 465
See application file for complete search history.

(56) References Cited

U.S. PATENT DOCUMENTS

| | | |
|---|---|---|
| 4,410,275 A | 10/1983 | Shaw et al. |
| 5,420,949 A | 5/1995 | Arima et al. |

(Continued)

OTHER PUBLICATIONS

"An Update on KVH Fiber Optic Gyros and Their Benefits Relative to Other Gyro Technologies," KVH Industries, Inc., (Jul. 2010—Second Edition), pp. 1-17.

(Continued)

*Primary Examiner* — Tarifur Chowdhury
*Assistant Examiner* — Sunghee Y Gray
(74) *Attorney, Agent, or Firm* — Perkins Coie LLP (57) ABSTRACT

An all-fiber interferometric fiber optic gyroscope having a minimum reciprocal configuration is described. The gyroscope comprises a polarized light source, a light detector, a light source coupler, a fiber optic loop coupler, and a polarization maintaining fiber optic loop. A first port of the light source coupler is counter-axially coupled to an output end of the polarized light source, and a second port of the light source coupler on the same side as the first port is coupled to the light detector. A third port on the other side of the light source coupler is counter-axially coupled to the fiber optic loop coupler, and the fiber optic loop coupler is counter-axially coupled to the polarization maintaining fiber optic loop. The light source splits the input polarized light and polarizes the optical signal propagated along a transmission arm alone, where the first and third ports are on the same transmission arm.

20 Claims, 6 Drawing Sheets

(56) References Cited

U.S. PATENT DOCUMENTS

| | | |
|---|---|---|
| 6,181,428 B1 | 1/2001 | Handrich et al. |
| 6,377,351 B1 | 4/2002 | Kim et al. |
| 6,463,195 B1 | 10/2002 | Sasaki et al. |
| 2011/0262090 A1 | 10/2011 | Jacobsen et al. |

OTHER PUBLICATIONS

Lefevre, H., "The Fiber-Optic Gyroscope," Glasgow, Scotland—Jun. 1992, 7 pages.

Snyder, et al., "Nonlinear Fiber Couplers: Switches and Polarization Beam Splitters," Optics Letters, vol. 14, No. 10 (May 15, 1989), pp. 517-519.

Morishita, K., "Wavelenght-Selective Optical-Fiber Directional Couplers Using Dispersive Materials," Optics Letters, vol. 13, No. 2 (Feb. 1988), pp. 158-160.

Wang, et al., "Method for suppressing the bias drift of interferometric all-fiber optic gyroscopes," Optics Letters, vol. 36(7), pp. 1191-1193 (2011).

Wang, et al., "Revised minimum reciprocity configuration and actualization methodology of interferometric all-fiber optic gyroscopes," Applied Optics, vol. 50(13), pp. 1856-1860 (2011).

Wu, et al., "A Novel Fabrication Method for All-Fiber, Weakly Fused, Polarization Beamsplitters," IEEE Photonics Technology Letters, Vo. 7, No. 7 (Jul. 1995), pp. 786-788.

Ye., et al., "New Fabrication Technique for High Performance Polarisation Maintaining Optical Fibre Couplers," Electronics Letters, Nov. 10, 1994, vol. 30, No. 23—pp. 1971-1972.

Zhang, G., "The Principles and Technologies of Fiber-Optic Gyroscope," National Defense Industry Press (May 2008), 3 pages. pp. 45-46 of the book relate to an optical structure having a minimum reciprocity.

FIG. 6

ALL-FIBER INTERFEROMETRIC FIBER OPTIC GYROSCOPE HAVING A MINIMUM RECIPROCAL CONFIGURATION This is a continuation of U.S. patent application Ser. No. 13/042,336, filed on Mar. 7, 2011, which is a continuation-in-part of International Patent Application No. PCT/CN2010/001175, filed on Aug. 3, 2010 under the Patent Cooperation Treaty (PCT), which claims priority to Chinese Patent Application No. 201010232656.8, filed on Jul. 16, 2010.

FIELD OF THE INVENTION

The present invention relates to all-fiber fiber optic gyroscopes, and in particular, it relates to an all-fiber interferometric fiber optic gyroscope having a minimum reciprocal configuration, which pertains to the technical field of fiber optic sensing.

DESCRIPTION OF THE RELATED ART

A gyroscope is an instrument for measuring angular velocity-angular displacement in inertial space, and its history can be traced back to thousands of years ago. Stone gyroscopes were unearthed from the Neolithic relics in Xia County, Shanxi province in China. Mechanical gyroscope is the first generation gyroscope, and laser gyroscope and fiber optic gyroscope are respectively second and third generation gyroscopes. Fiber optic gyroscopes emerged in 1976 and mass production thereof was launched in the 1990s. The all-fiber interferometric fiber optic gyroscope is an important variety in the family of fiber optic gyroscope, and it is widely applicable in the fields of navigation, guidance, positioning, automatic north seeking, damping on vibration for trains or ships, orientation of antenna aiming systems, measurement of oil well deviation, inspection of distortion and vibration of large-scale construction, automatic control, etc.

Figure 1:
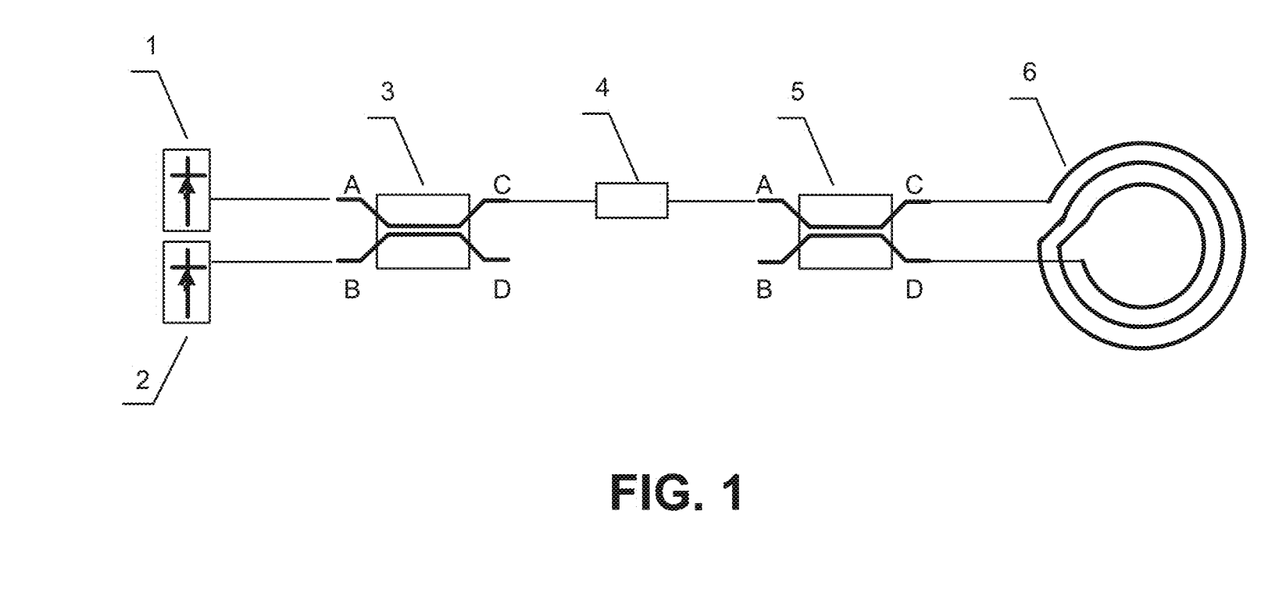
FIG. 1 is a schematic of the optical path of a minimum reciprocal configuration of a typical all-fiber interferometric fiber optic gyroscope.

The optical structure of a typical all-fiber interferometric fiber optic gyroscope is shown in FIG. 1, wherein its optical elements include: a superluminescent diode, a photodetector diode, a light source coupler, a fiber optic loop coupler, a polarizer (or depolarizer), a fiber optic loop (i.e., fiber optic coil), altogether six optical elements. The configuration of the six optical elements is called a minimum reciprocal configuration of an all-fiber interferometric fiber optic gyroscope. The paths between ports A-C and B-D of the light source coupler 3 are transmission arms and have a beam splitting function. The paths between ports A-D and B-C are coupling arms which have a light splitting function.

According to FIG. 1, the operation principle of the typical all-fiber interferometric fiber optic gyroscope is: polarized light (elliptically or circularly polarized light) emitted from the superluminescent diode 1 is input into port A of the light source coupler 3 and is split into two beams of polarized light; wherein the beam of polarized light which travels along a transmission arm and is output from port C is input into the polarizer 4; the polarizer 4 converts the input polarized light into linearly polarized light and inputs the linearly polarized light into port A of the fiber optic loop coupler 5. The fiber optic loop coupler 5 splits the input linearly polarized light into two beams and outputs them through ports C and D thereof; the linearly polarized light beams output from ports C and D of the fiber optic loop coupler 5 travel clockwise and counter-clockwise along the fiber optic loop 6, respectively, and then return to the fiber optic loop coupler 5 through ports C and D and excite a coherent superposition therein; after the coherent superposition, the linearly polarized light is again split into two beams by the fiber optic loop coupler 5 and are output from ports A and B of the fiber optic loop coupler 5.

In the linearly polarized light output from port A of the fiber optic loop coupler 5: the linearly polarized light from port A traveling clockwise passes through each of the transmission arm and the coupling arm of the fiber optic loop coupler 5 once; and the linearly polarized light traveling counter-clockwise also passes through each of the transmission arm and the coupling arm of the fiber optic loop coupler 5 once. Therefore, the optical paths covered by the two beams of linearly polarized light which travel clockwise and counter-clockwise respectively from port A of the fiber optic loop coupler 5 are identical when they return to port A of the fiber optic loop coupler 5, and thus the linearly polarized light generated by their coherent superposition are called reciprocal light, and the port outputting the reciprocal light is called reciprocal port. However, in the linearly polarized light output through port B of the fiber optic loop coupler 5: the linearly polarized light traveling clockwise from port A of the fiber optic loop coupler 5 passes through the transmission arm of the fiber optic loop coupler 5 twice; and the linearly polarized light traveling counter-clockwise passes through the coupling arm of the fiber optic loop coupler 5 twice. Therefore, the optical paths covered by the two beams of linearly polarized light which travel clockwise and counter-clockwise respectively from port A of the fiber optic loop coupler 5 and reach port B of the fiber optic loop coupler 5 are different, and thus the linearly polarized light generated by their coherent superposition are called nonreciprocal light, and the port outputting the nonreciprocal light is called nonreciprocal port. Nonreciprocal light signal cannot be used as detection signal of fiber optic gyroscopes.

The linearly polarized light output through port A (the reciprocal port) of the fiber optic loop coupler 5 is input into port C of the light source coupler 3 through the polarizer 4, and the light source coupler 3 splits the linearly polarized light signal input through port C into two beams, wherein one beam is input into the photodetector 2 through port B thereof. When the fiber optic loop 6 is stationary, the optical paths covered by the two beams linearly polarized light which travel clockwise and counter-clockwise respectively from port A of the fiber optic loop coupler 5 are identical when they return to port A of the fiber optic loop coupler 5; and when the fiber optic loop 6 rotates, the optical paths covered by the two beams of linearly polarized light which travel clockwise and counter-clockwise respectively from port A of the fiber optic loop coupler 5 are different when they return to port A of the fiber optic loop coupler 5; and under said two circumstances, the intensity of the optical signal received by the photodetector 2 differs, and thus the angular velocity of the rotation of the fiber optic loop 6 can be calculated. This "minimum reciprocal configuration" has never been challenged since the advent of the all-fiber interferometric fiber optic gyroscope. References: (1) Hervé C. Lefèvre, "The Fiber-Optic Gyroscope", Artech House, Boston, 1993. (2) The Principles and Technologies of Fiber-Optic Gyroscope, Zhang Guicai, National Defense Industry Press, 2008.

SUMMARY

This summary is provided to introduce in a simplified form certain concepts that are further described in the Detailed Description below and the drawings. This summary is not intended to identify essential features of the claimed subject matter or to limit the scope of the claimed subject matter.

Introduced here is a new all-fiber interferometric fiber optic gyroscope having a minimum reciprocal configuration. A new all-fiber interferometric fiber optic gyroscope having a minimum reciprocal configuration, as introduced here in, requires only five optical elements. The light source coupler in FIG. 1 is a coupler in the general sense and is exclusively used for splitting optical signal. According to the characteristics of the fused taper PANDA polarization maintaining fiber optic coupler, the present invention includes a fused taper PANDA polarization maintaining fiber optic coupler which has the two functions of simultaneously splitting the input optical signal and polarizing the optical signal traveling along the transmission arm alone as the light source coupler such that the minimum reciprocal configuration of the all-fiber interferometric fiber optic gyroscope is reduced from six optical elements to five, with the polarizer (or depolarizer) removed.

The technical solution of the present invention according to one embodiment is as follows:

An all-fiber interferometric fiber optic gyroscope having a minimum reciprocal configuration, characterized in that it comprises a polarized light source, a detection unit, a light source coupler, a fiber optic loop coupler, a polarization maintaining fiber optic loop; port A of the light source coupler is counter-axially coupled to an output end of the polarized light source, the other port of the light source coupler on the same side as port A is coupled to the detection unit, port C on the other side of the light source coupler is counter-axially coupled to the fiber optic loop coupler, and the fiber optic loop coupler is counter-axially coupled to the polarization maintaining fiber optic loop; wherein the light source coupler is for splitting input polarized light and polarizing the optical signal propagated along a transmission arm alone, and ports A and C are two ports of the light source coupler on the same transmission arm.

Furthermore, the transmission arm of the light source coupler in one embodiment has an output polarization extinction ratio greater than or equal to ( ) 20 dB.

Furthermore, the light source coupler can be a coupler manufactured by a method for making a fused taper PANDA polarization maintaining fiber optic coupler.

Furthermore, the light source coupler can be a 2×2 or 1×2 coupler.

Furthermore, the fiber optic loop coupler can be a 2×2 or 1×2 coupler.

Furthermore, the polarized light source can be a superluminescent diode.

Furthermore, the detection unit can be a photodetector diode.

Furthermore, the polarization maintaining fiber optic loop can be a fiber optic coil wound with polarization maintaining optical fiber.

Figure 2:
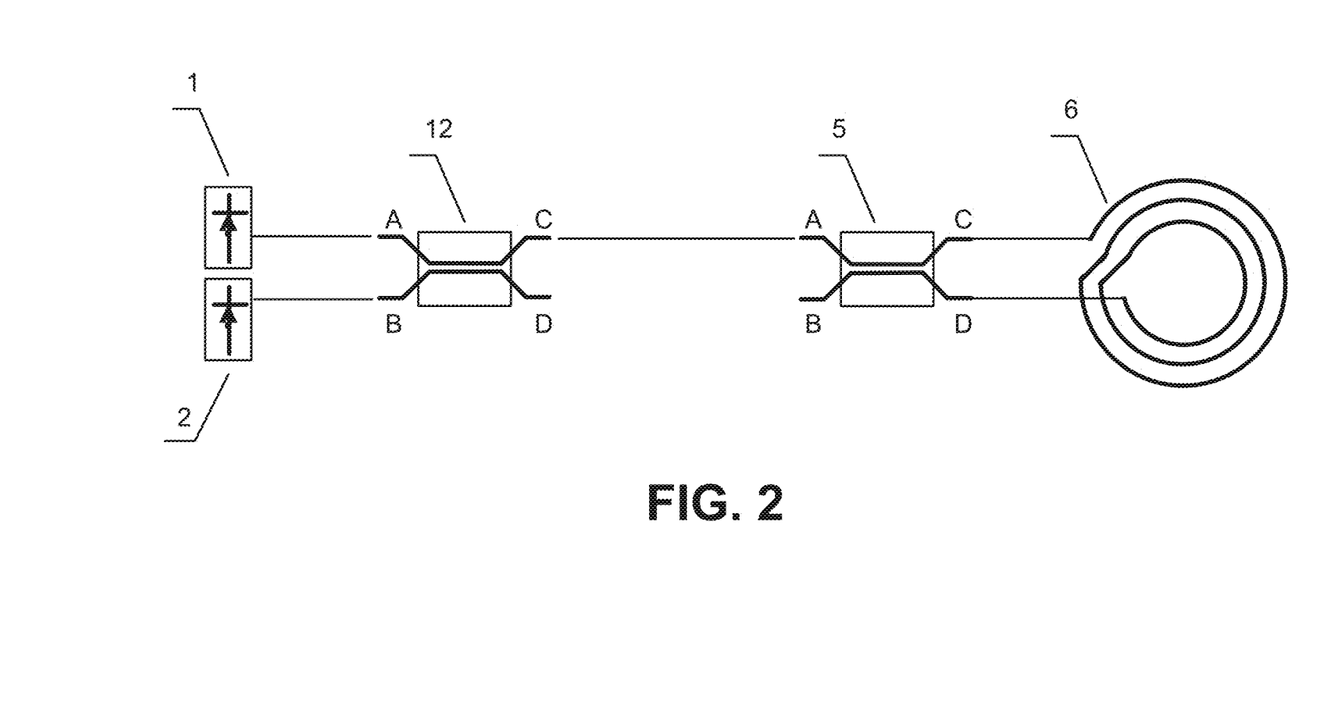
FIG. 2 is a schematic of the optical structure of an all-fiber interferometric fiber optic gyroscope according to the present invention.

In comparison with the existing "minimum reciprocal configuration" of all-fiber interferometric fiber optic gyroscope, the all-fiber interferometric fiber optic gyroscope of the present invention is a reduced minimum reciprocal configuration, and said minimum reciprocal configuration comprises: a superluminescent diode, a photodetector diode, a light source coupler, a fiber optic loop coupler and a fiber optic loop, altogether five optical elements, as shown in FIG. 2, and the coupling manner thereof is provided as follows:

The superluminescent diode (which outputs elliptically or circularly polarized light) is coupled to port A of the light source coupler, the photodetector diode is coupled to port B of the light source coupler, port C of the light source coupler is coupled to port A of the fiber optic loop coupler, port D of the light source coupler is void, ports C and D of the fiber optic loop coupler are respectively coupled to the two ports of the fiber optic loop; and port B of the fiber optic loop coupler is a nonreciprocal port and is void.

The light source coupler has the following characteristics: The transmission arm thereof has the two functions of splitting and polarizing optical signal; and the coupling arm thereof merely has a light splitting function with respect to the optical signal. The light source coupler of the existing gyroscope configuration merely has a light splitting function, and the output light after light splitting is polarized by the polarizer. The light source coupler in the present invention also differs from a polarizing beam splitter. Specifically, a polarizing beam splitter's transmission arm and the coupling arm thereof respectively propagate beams of linearly polarized light whose polarizing surfaces are perpendicular to each other, i.e., it can polarize signals of circularly polarized light and elliptically polarized light, whereas it does not split linearly polarized light.

In comparison with the prior art, the advantageous effect of the present invention is as follows:

The present invention improves the minimum configuration of the fiber optic gyroscope by reducing the traditional configuration comprising six optical elements to a configuration comprising five such that the structure complexity of the all-fiber interferometric fiber optic gyroscope and the production cost are reduced, and the reliability of the gyroscope is enhanced, meanwhile, since the fuse splice is also reduced and the polarizer, removed, the optical loss is reduced such that the accuracy of the gyroscope is further enhanced.

DETAILED DESCRIPTION

Figure 3:
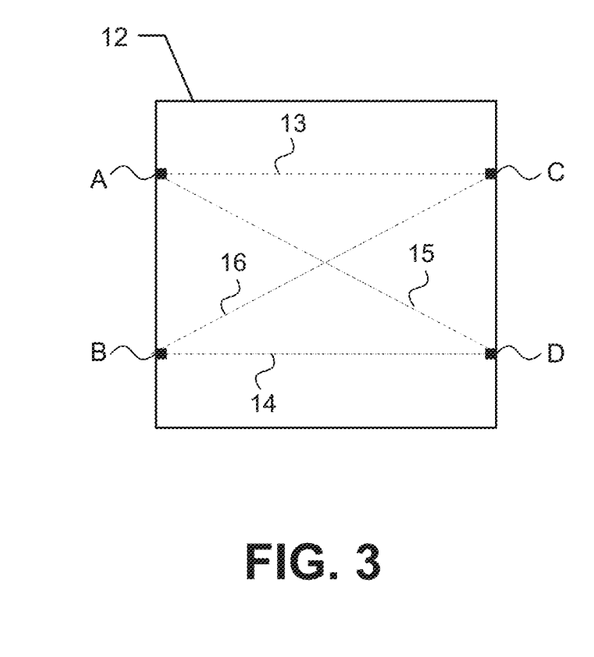
FIG. 3 shows the light source coupler of the present invention in greater detail.

As shown in FIGS. 2 and 3, the all-fiber interferometric fiber optic gyroscope of the present invention comprises: a superluminescent diode 1, a photodetector diode 2, a light source coupler 12, a fiber optic loop coupler 5 and a polarization maintaining fiber optic loop 6, altogether five optical elements. Paths 13 and 14 between ports A-C and B-D, respectively, of the light source coupler 12 are transmission arms which convert the input light into linearly polarized light and have a light splitting function to linearly polarized light. Paths 15 and 16 between ports A-D and B-C, respectively, are coupling arms which merely have a light splitting function.

The superluminescent diode 1 can output circularly polarized light, elliptically polarized light or linearly polarized light and then input the polarized light output from the superluminescent diode 1 into any one of ports A, B, C or D of the light source coupler 12, and the present embodiment selects port A as the input port, as shown in FIG. 2. The light source coupler 12 splits the input optical signal into two beams and outputs them through ports A, B or C, D respectively. If the optical signal is input through ports A, B, the split beams are output from ports C, D; while if the optical signal is input through ports C, D, the split beams are output from ports A, B. The present embodiment selects ports C, D on the same side as the output ports, as shown in FIG. 2.

The optical signal output through the port in communication with the input port is linearly polarized light (polarization extinction ratio ≥20 dB), and the optical signal output through the port which is not in communication with the input port is elliptically or circularly polarized light. The elliptically or circularly polarized light is kept void, and the linearly polarized light can be input through any one of A, B, C or D into the fiber optic loop coupler 5. The present embodiment selects port A of the fiber optic loop coupler 5 as the input port of the fiber optic loop coupler 5, as shown in FIG. 2. Port A of the light source coupler 12 coupled to the signal output port of the superluminescent diode 1 is explained below as an example, as shown in FIG. 2.

Port A of the light source coupler 12 is counter-axially coupled to the signal output port of the superluminescent diode 1. The light source coupler 12 has the function of splitting the input polarized light and polarizing only the optical signal propagated along the transmission arm. The light output through the output port C of the light source coupler 12 is linearly polarized light. Port C of the light source coupler 12 is counter-axially coupled to port A of the fiber optic loop coupler 5, and the fiber optic loop coupler 5 splits the input linearly polarized light signal into two beams of linearly polarized light having the same power and outputs them through ports C and D. The optical signals output through ports C and D of the fiber optic loop coupler 5 are input through the two ports of the polarization maintaining fiber optic loop 6 and travel clockwise and counter-clockwise, respectively.

The two beams of linearly polarized light traveling in opposite directions along the polarization maintaining fiber optic loop 6 return to the fiber optic loop coupler 5 through the fiber optic loop 6 and excite a coherence superposition in the fiber optic loop coupler 5. The optical signal after the coherence superposition is then split into two beams of linearly polarized light and are output through ports A and B from the fiber optic loop coupler 5. In the linearly polarized light output through port A from the fiber optic loop coupler 5: The linearly polarized light signal emitted from port A of the fiber optic loop coupler 5 which travels clockwise passes through each of the transmission arm and the coupling arm of the fiber optic loop coupler 5 once; and the linearly polarized light traveling counter-clockwise also passes through each of the transmission arm and the coupling of the fiber optic loop coupler 5 once. Therefore, the optical paths covered by the beams of linearly polarized light traveling clockwise and counter-clockwise from port A of the fiber optic loop coupler 5 are identical when they return to port A of the fiber optic loop coupler 5 without any difference, and thus are reciprocal. Thus, the linearly polarized light generated by their coherent superposition is called reciprocal light, and the port outputting the reciprocal light is called a reciprocal port. However, in the linearly polarized light output through port B of the fiber optic loop coupler 5: The linearly polarized light emitted from port A of the fiber optic loop coupler 5 and traveling clockwise passes through the transmission arm of the fiber optic loop coupler 5 twice; and the linearly polarized light traveling counter-clockwise passes through the coupling arm of the fiber optic loop coupler 5 twice. Therefore, the optical paths covered by the beams of linearly polarized light traveling clockwise and counter-clockwise respectively from port A of the fiber optic loop coupler 5 are different when they reach port B of the fiber optic loop coupler 5, and thus the linearly polarized light generated by their coherent superposition are called nonreciprocal light, and the port outputting the nonreciprocal light is called nonreciprocal port. Nonreciprocal light signal cannot be used as detection signal of fiber optic gyroscopes, and is thus kept void, while the reciprocal optical signal is input through port C of the light source coupler 12.

The light source coupler 12 splits the optical signal input through port C into two beams, wherein one beam is input into the photodetector diode through port B of the light source coupler 12 and form a received signal of the all-fiber interferometric fiber optic gyroscope. The output angular velocity of the all-fiber interferometric fiber optic gyroscope can be obtained through demodulating, amplifying and processing the received signal.

It can be seen from FIG. 2 that the all-fiber interferometric fiber optic gyroscope of the present invention comprises only five optical elements.

The light source coupler 12 of the present invention is, in one embodiment, a fused taper PANDA polarization maintaining fiber optic coupler, characterized in that if the input optical signal of the light source coupler 12 is polarized light (linearly, circularly or elliptically polarized light), the optical signal output through the transmission arm is linearly polarized light (polarization extinction ratio ≥20 dB), while the optical signal output through the coupling arm is polarized light (linearly, circularly or elliptically polarized light, same as the input). The light source coupler 12 can be manufactured by a method for making the existing fused taper PANDA polarization maintaining fiber optic coupler; or a suitable (i.e., a coupler simultaneously splitting the input optical signal and polarizing the optical signal propagated through the transmission arm alone) coupler can be selected as the light source coupler in the present invention by detecting the existing light source couplers.

The fiber optic loop coupler 5 is a fused taper PANDA polarization maintaining fiber optic coupler, characterized in that if the input optical signal of the fiber optic loop coupler 5 is a linearly polarized light signal, the two beams of output optical signal are also linearly polarized light.

The fiber optic loop 6 of the present invention is a fiber optic coil wound with PANDA polarization maintaining optical fiber, and it can also adopt fiber optic coil wound with other kinds of polarization maintaining optical fiber.

Figure 4:
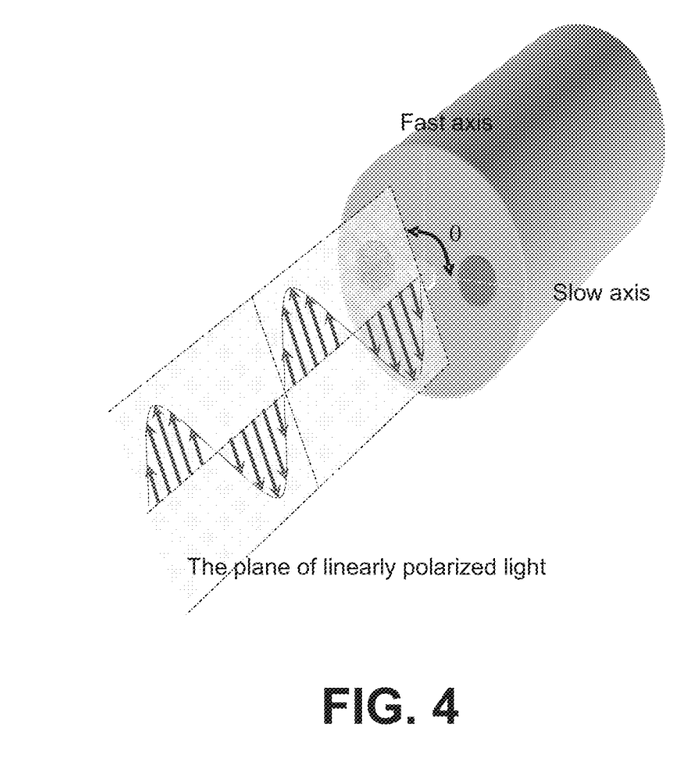
FIG. 4 illustrates polarization of light input to an optical fiber.

Referring now to FIG. 4, conventional fused-taper PMF couplers combine or split the input light and maintain their polarization states at the output ports. The splitting ratio of ports C and D is almost a constant when the input polarization angle $\theta$ is varied from 0° to 180° (i.e., changing the input polarization states). The polarization sensitivity of a conventional coupler should be as small as possible.

Figure 5:
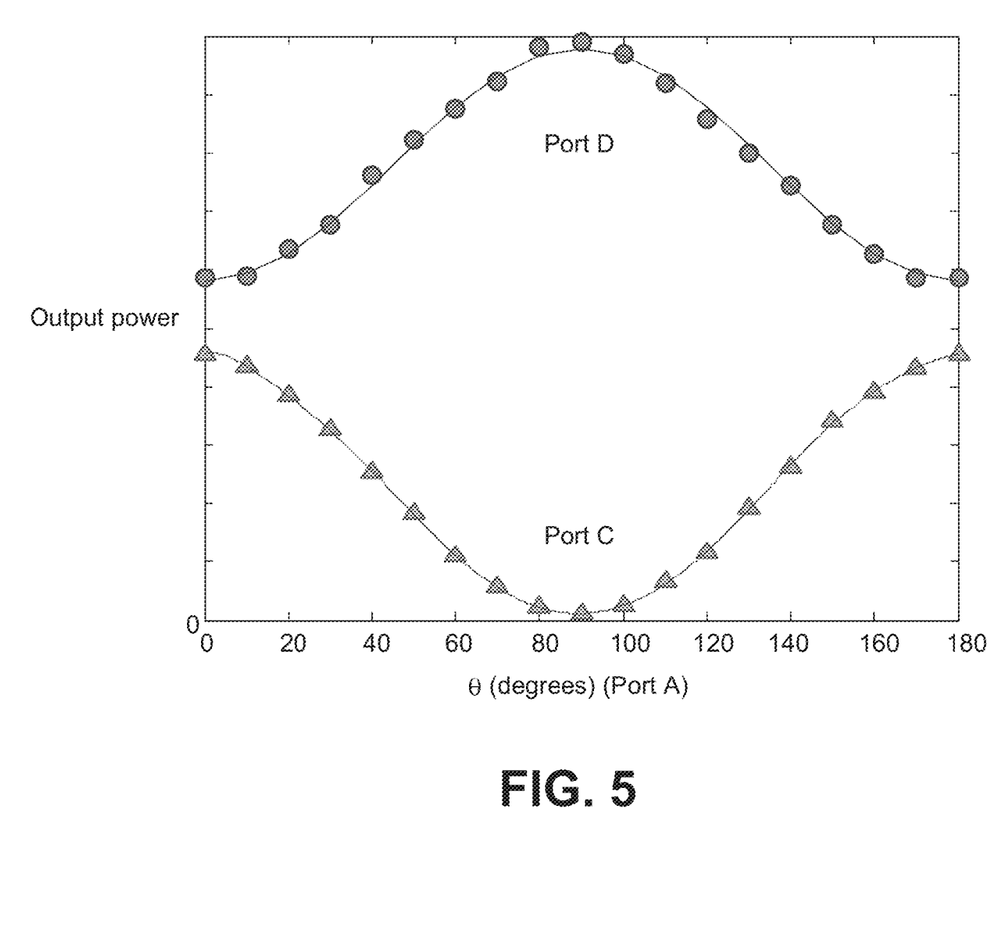
FIG. 5 shows a pair of curves illustrating light transmission characteristics of the light source coupler according to an embodiment of the invention.

In contrast, FIG. 5 shows the characteristics of the light source coupler 12 (e.g., a fused-taper PMF coupler) according to one embodiment of the present invention. The lower curve represents the output power at port C of light source coupler 12. The upper curve represents the output power at port D of light source coupler 12. The output powers of the PMF coupler are dependent on the input polarization angle $\theta$. This means that the coupling factor is not constant, but varies with input polarization states. For example, in one embodiment, when linearly polarized light with $\theta=0°$ is applied to port A of the light source coupler 12, as shown in FIG. 5, then ports C and D will output linearly polarized light with a splitting ratio $PC(\theta=0°)/PD(\theta=0°)$ equal to about 44:56. Conversely, when linearly polarized light with $\theta=90°$ is applied to port A, almost all of the light energy passes through port D, while little output light intensity is measured from port C. Thus, ports C and D will output linearly polarized light with a splitting ratio PC($\theta$=90°)/PD($\theta$=90°) of about 1:99 in that embodiment. Therefore, if we apply circular polarized light to port A, port C will output linearly polarized light with polarization extinction ratio (PER) of about 10 lg[PC($\theta$=0°)/PC($\theta$=90°)]=20 dB, and port D will output elliptically polarized light with PER of about 10 lg[PD($\theta$=0°)/PD($\theta$=90°)]=2 dB. This means that for circular/elliptically polarized light, the transmission arm (port A$\leftrightarrow$ port C and port B$\leftrightarrow$ port D) will act as an in-line PMF polarizer to translate the circular polarized light into linearly polarized light with high PER. On the other hand, the coupling arm (port A$\leftrightarrow$ port D and port B$\leftrightarrow$ port C) will act as a conventional fused-taper PMF coupler for any kinds of polarized light.

Figure 6:
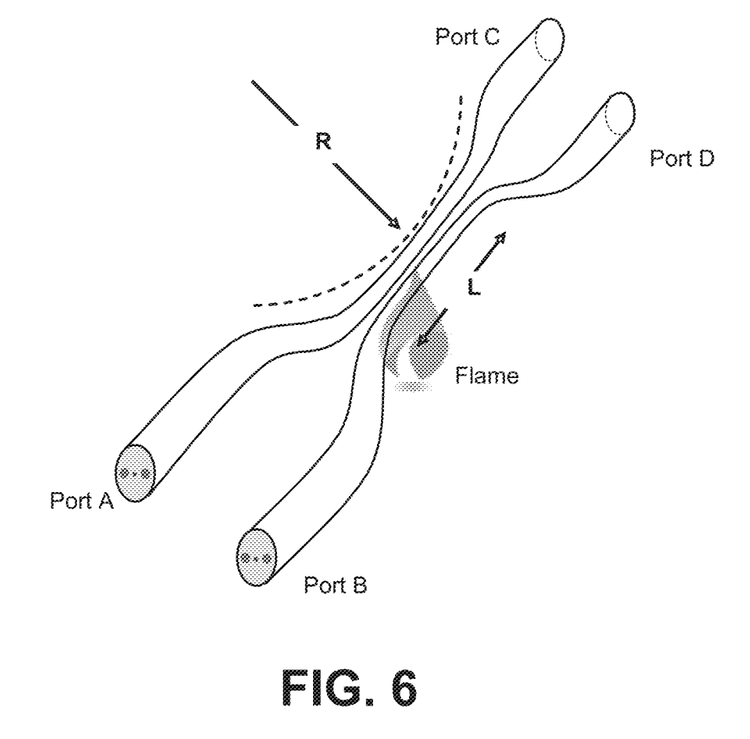
FIG. 6 illustrates a technique for making the light source coupler according to an embodiment of the invention.

A fused-taper PMF fiber coupler with these characteristics can be produced as shown in FIG. 6. The light source coupler 12 can be produced by measuring the output light power of port C and port D while tuning the radius R and the length L of the fused-taper section (e.g., by applying a flame to heat the fused-taper section of the coupler 12) until 10 lg[PC($\theta$=0°)/PD($\theta$=90°)]>20 dB. In one embodiment L is in the range of 5 to 15 mm while R is in the range of 250 to 500 mm.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A fiber optic gyroscope comprising:
a light source;
a light detector;
a fiber optic loop coupler;
a polarization maintaining fiber optic loop coupled to the fiber optic loop coupler; and
a light source coupler directly coupled between the light source and the fiber optic loop coupler and coupled between the light detector and the fiber optic loop coupler, the light source coupler having a plurality of ports and further having a plurality of transmission arms and a plurality of coupling arms defined between pairs of the ports; wherein the light source coupler is constructed so as to split input light, wherein a transmission arm of the plurality of transmission arms has a first light propagation characteristic that results in polarization of an optical signal propagated along said transmission arm and wherein the coupling arms each have a second light propagation characteristic that results in no polarization of an optical signal propagated along any of the coupling arms.

2. The gyroscope according to claim 1, wherein said transmission arm has an output polarization extinction ratio greater than or equal to 20 dB.

3. The gyroscope according to claim 2, wherein the light source coupler is a coupler manufactured by a method for making a fused taper PANDA polarization maintaining fiber optic coupler.

4. The gyroscope according to claim 1, wherein the light source coupler is a coupler manufactured by a method for making a fused taper PANDA polarization maintaining fiber optic coupler.

5. The gyroscope according to claim 4, wherein the light source coupler is a 2×2 or 1×2 coupler.

6. The gyroscope according to claim 1, wherein the fiber optic loop coupler is a 2×2 or 1×2 coupler.

7. The gyroscope according to claim 1, wherein the light source is a superluminescent diode.

8. The gyroscope according to claim 1, wherein the detection unit is a photodetector diode.

9. The gyroscope according to claim 1, wherein the polarization maintaining fiber optic loop is a fiber optic coil wound with polarization maintaining optical fiber.

10. A fiber optic gyroscope comprising:
a light source;
a detection unit;
a fiber optic loop coupler;
a polarization maintaining fiber optic loop, wherein the fiber optic loop coupler is coupled to the polarization maintaining fiber optic loop; and
a light source coupler having a plurality of ports; wherein a first port of the light source coupler is coupled, with polarization axis alignment, to the light source, a second port of the light source coupler of the light source coupler is coupled to the detection unit; wherein a third port of the light source coupler is coupled, with polarization axis alignment, to the fiber optic loop coupler;
the light source coupler including a fused-taper section having a radius and a length, wherein the radius and the length are such that a transmission arm defined between the first and third ports is capable of translating circularly polarized light or elliptically polarized light into linearly polarized light.

11. The gyroscope according to claim 10, wherein the transmission arm of the light source coupler has an output polarization extinction ratio greater than or equal to 20 dB.

12. The gyroscope according to claim 10, wherein the light source coupler is a coupler manufactured by a method for making a fused taper PANDA polarization maintaining fiber optic coupler.

13. The gyroscope according to claim 10, wherein the radius of the fused-taper section is in a range of 250 to 500 mm, and the length of the fused-taper section is in a range of 5 to 15 mm.

14. The gyroscope according to claim 13, wherein the light source coupler is a 2×2 or 1×2 coupler.

15. The gyroscope according to claim 10, wherein the fiber optic loop coupler is a 2×2 or 1×2 coupler.

16. The gyroscope according to claim 10, wherein the light source is a superluminescent diode.

17. A fiber optic gyroscope comprising:
a light source;
a light source coupler having a plurality of ports; wherein a first port of the light source coupler is coupled to the light source;
a detection unit coupled to a second port of the light source coupler;

a fiber optic loop coupler directly coupled to a third port of the light source coupler; and a polarization maintaining fiber optic loop coupled to the fiber optic loop coupler;

wherein the light source coupler has a transmission arm defined between the first and third ports and a coupling arm defined between the second and third ports;

wherein the transmission arm has a first light propagation characteristic that results in polarization of an optical signal propagating along the transmission arm, and the coupling arm has a second light propagation characteristic that results in no polarization of an optical signal propagating along the coupling arm.

18. The gyroscope according to claim 17, wherein the light source coupler is configured to split an optical signal input from the third port into the first and second ports.

19. The gyroscope according to claim 17, wherein the transmission arm is configured to translate circularly polarized optical signal or elliptically polarized optical signal to linearly polarized optical signal.

20. The gyroscope according to claim 17, wherein the light source is configured to emit a circularly polarized optical signal or an elliptically polarized optical signal.

* * * * *